US012228071B1

(12) United States Patent
Alahyari et al.

(10) Patent No.: US 12,228,071 B1
(45) Date of Patent: Feb. 18, 2025

(54) STEAM-INJECTED ENGINE HEAT EXCHANGER ARRANGEMENT

(71) Applicant: RTX CORPORATION, Farmington, CT (US)

(72) Inventors: Abbas A. Alahyari, Glastonbury, CT (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/678,605

(22) Filed: May 30, 2024

(51) Int. Cl.
*F02C 3/30* (2006.01)
*F01N 3/00* (2006.01)

(52) U.S. Cl.
CPC ............... *F02C 3/30* (2013.01); *F01N 3/005* (2013.01); *F05D 2220/323* (2013.01); *F05D 2230/60* (2013.01); *F05D 2260/232* (2013.01)

(58) Field of Classification Search
CPC ...... F02C 3/30; F01N 3/005; F05D 2220/323; F05D 2230/60; F05D 2260/232
See application file for complete search history.

(56) References Cited

U.S. PATENT DOCUMENTS

| | | | |
|---|---|---|---|
| 11,603,798 B1* | 3/2023 | Terwilliger | ............... F02C 7/18 |
| 11,635,022 B1* | 4/2023 | Terwilliger | ............... F02C 7/12 |
| | | | 60/775 |
| 2020/0182113 A1* | 6/2020 | Kupratis | ................ F02C 3/305 |
| 2021/0207500 A1* | 7/2021 | Klingels | ................ F02C 3/305 |
| 2023/0150678 A1* | 5/2023 | Klingels | ............... B64D 33/04 |
| | | | 244/55 |

* cited by examiner

*Primary Examiner* — Steven M Sutherland
(74) *Attorney, Agent, or Firm* — Carlson, Gaskey & Olds, P.C.

(57) ABSTRACT

An aircraft propulsion system includes a core engine including a compressor, combustor, and turbine section. An inlet airflow is compressed communicated to the combustor, mixed with fuel, and ignited to generate an exhaust gas flow that is expanded through the turbine section. A water recovery system includes a series of condensers that include a series of passages for water containing exhaust gas flow. The series of passages are defined circumferentially about the propulsor axis such that recovered water drains downward in a direction of gravity through the series of passages.

20 Claims, 4 Drawing Sheets

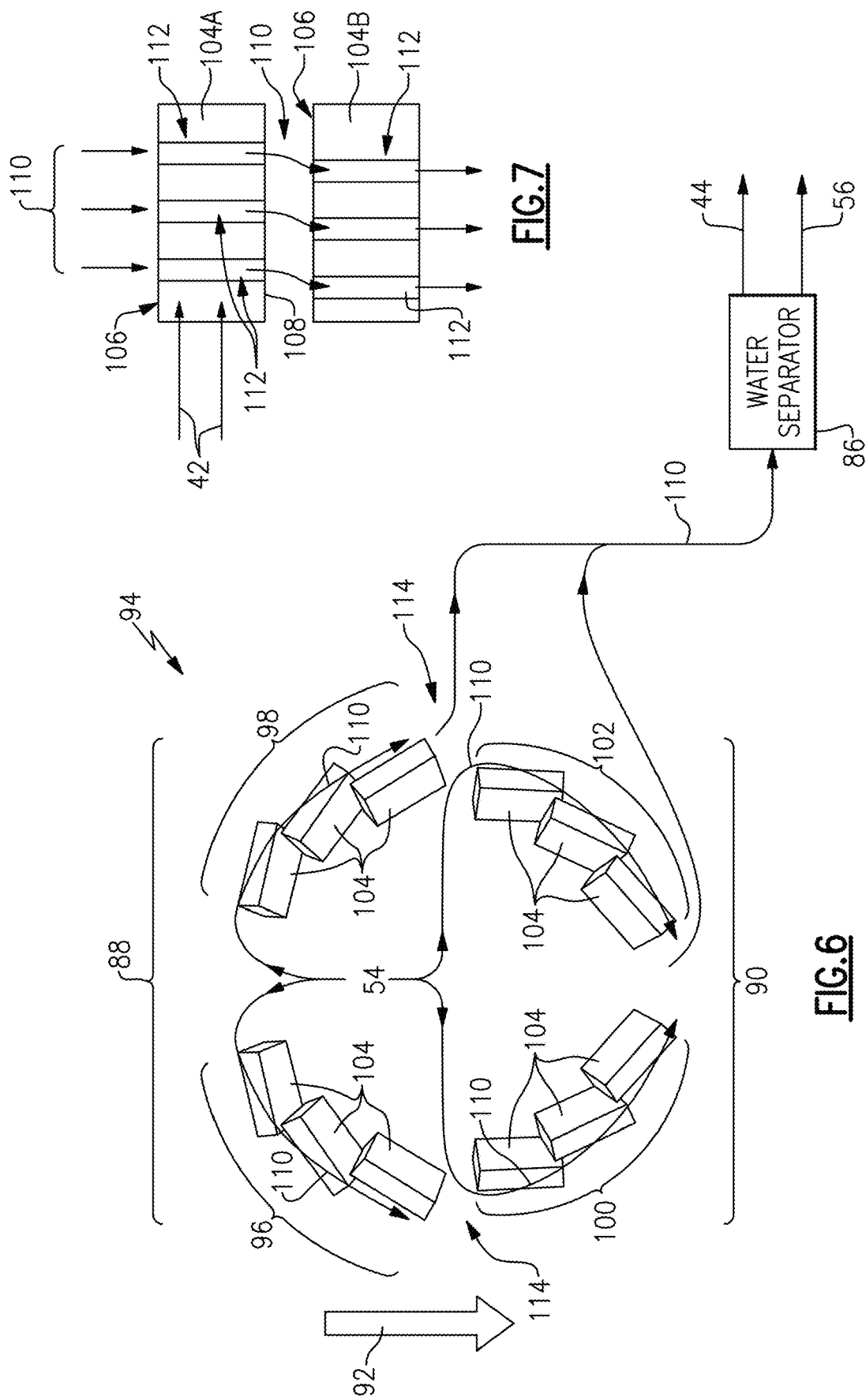

STEAM-INJECTED ENGINE HEAT EXCHANGER ARRANGEMENT

STATEMENT REGARDING FEDERALLY SPONSORED RESEARCH OR DEVELOPMENT

This invention was made with Government support under Contract No.: DE-AR0001561 awarded by the Department of Energy, Office of ARPA-E. The Government has certain rights in this invention.

TECHNICAL FIELD

The present disclosure relates generally to a heat exchanger arrangement for a steam injected gas turbine engine.

BACKGROUND

An aircraft propulsion system typically includes a gas turbine engine with a propulsive fan section, a compressor section, a combustor section, and a turbine section. Air entering the compressor section is compressed and delivered into the combustion section where it is mixed with fuel and ignited to generate a high-energy exhaust gas flow. Some energy in the high energy exhaust flow is recovered as it is expanded through a turbine section. Even with the use of alternate fuels, a large amount of energy in the form of heat is simply exhausted from the turbine section into the atmosphere. Steam injection can provide improved propulsive efficiencies. Water recovered from the exhaust gas flow may be transformed into steam using thermal energy from the exhaust gas flow. Water recovery is performed with condensing heat exchangers arranged relative to the engine that directs water to an evaporator.

Turbine engine manufacturers continue to seek further improvements to engine performance including improvements to thermal, transfer and propulsive efficiencies.

SUMMARY

An aircraft propulsion system according to an exemplary embodiment of this disclosure, among other possible things includes, a core engine including a compressor, combustor, and turbine section. An inlet airflow is compressed communicated to the combustor, mixed with fuel, and ignited to generate an exhaust gas flow that is expanded through the turbine section A propulsor is driven about a propulsor axis by the core engine. A water recovery system comprises a series of condensers that include a series of passages for water containing exhaust gas flow. The series of passage are defined about the propulsor axis such that recovered water drains downward in a direction of gravity through the series of passages and an evaporator where a steam flow is generated from water separated from the exhaust gas flow and communicated to the combustor.

In a further embodiment of the foregoing aircraft propulsion system, each of the series of condensers comprise a top spaced radially apart from a bottom, an upper side spaced circumferentially from a lower side, a forward side, and an aft side, and at least one of the series of passages extends between the upper side and the lower side.

In a further embodiment of any of the foregoing aircraft propulsion systems, each of the series of condensers is configured such that the passages extend between the upper side and the lower side.

In a further embodiment of any of the foregoing aircraft propulsion systems, a cooling flow is in communication with the top and the bottom of each of the series of condensers.

In a further embodiment of any of the foregoing aircraft propulsion systems, the top and bottom extend axially between the forward side and the aft side.

In a further embodiment of any of the foregoing aircraft propulsion systems, the series of passages are all in flow communication with each other.

In a further embodiment of any of the foregoing aircraft propulsion systems, the series of passages comprise a first grouping of passages communicating water along a first side of the engine and a second grouping of passages communicating water along a second side of the engine.

In a further embodiment of any of the foregoing aircraft propulsion systems, the system includes at least one outlet where water from the series of passages is communicated to the evaporator.

In a further embodiment of any of the foregoing aircraft propulsion systems, the evaporator communicates heat from the exhaust gas flow into the water to generate the steam flow.

In a further embodiment of any of the foregoing aircraft propulsion systems, the system includes a support structure at least partially surrounding the core engine. The series of condensers are mounted to the support structure.

In a further embodiment of any of the foregoing aircraft propulsion systems, the support structure comprises a nacelle surrounding a portion of the core engine.

A water recovery system for an aircraft propulsion system according to an exemplary embodiment of this disclosure, among other possible things includes, a series of condensers comprising a series of passages for an exhaust gas flow. Each of the series of condensers comprise a top spaced radially apart from a bottom, an upper side spaced circumferentially from a lower side, a forward side, and an aft side. The series of passage are defined about an engine longitudinal axis such that recovered water drains downward in a direction of gravity through the series of passages and an evaporator where a steam flow is generated from water separated from the exhaust gas flow for communication to a core engine.

In a further embodiment of the foregoing water recovery system, the series of passages comprise a first grouping of passages communicating water along a first side of the engine and a second grouping of passages communicating water along a second side of the engine.

In a further embodiment of any of the foregoing water recovery systems, at least one of the series of passages extends between the upper side and the lower side of each of the series of condensers.

In a further embodiment of any of the foregoing water recovery systems, the series of passages are all in flow communication with each other.

In a further embodiment of any of the foregoing water recovery systems, the series of passages comprise a first grouping of passages communicating water along a first side of the series of condensers and a second grouping of passages communicating water along a second side of the series of condensers.

In a further embodiment of any of the foregoing water recovery systems, each of the series of condensers is configured to comprise at least one exhaust gas passage that extends between the bottom and the top.

In a further embodiment of any of the foregoing water recovery systems, a cooling flow is in communication with the at least one of the top and the bottom of each of the series of condensers.

A method of assembling an aircraft propulsion system according to an exemplary embodiment of this disclosure, among other possible things includes, assembling a core engine comprising a compressor, combustor and turbine section that is configured to compress and communicate an inlet airflow to the combustor. The compressed inlet airflow is mixed with fuel and ignited to generate an exhaust gas flow that is expanded through the turbine section, assembling a propulsor configured to be driven about a propulsor axis by the core engine and assembling a water recovery system including a series of condensers that comprise a series of passages for water recovered from the exhaust gas flow. The series of passages are disposed about the propulsor axis such that recovered water drains downward in a direction of gravity through the series of passages and assembling an evaporator that is configured for generating a steam flow using heat from the exhaust gas flow to vaporize water separated from the exhaust gas flow by the series of condensers and to communicate the generated steam flow to the combustor.

In a further embodiment of the foregoing method, the method includes assembling the series of condensers to receive a cooling flow for condensing water from the exhaust gas flow.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 6 is a schematic view of another example condenser configuration.

FIG. 7 is a schematic view of another example condenser.

DETAILED DESCRIPTION

Figure 1:
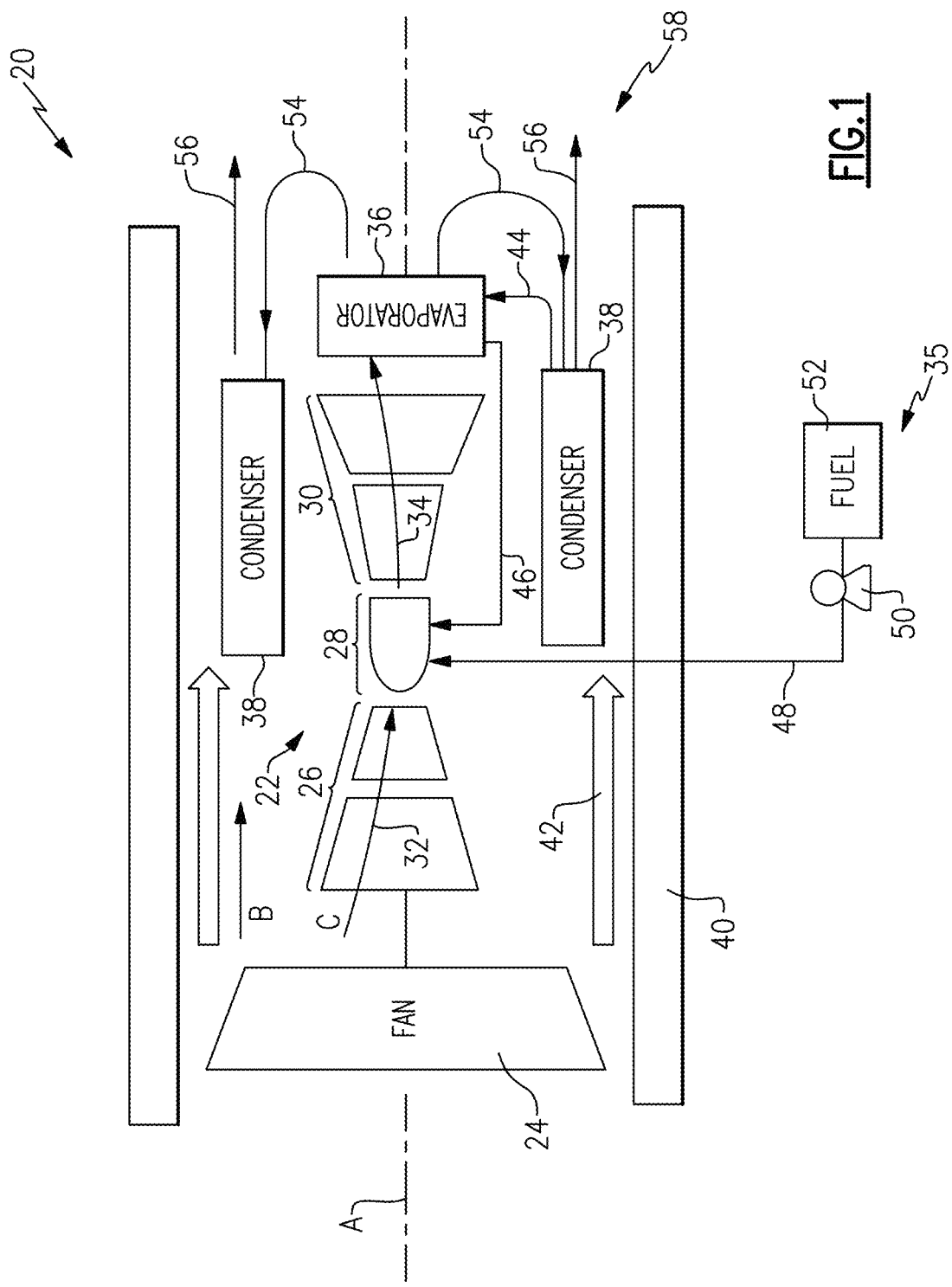
FIG. 1 is a schematic view of an example aircraft propulsion system.

FIG. 1 schematically illustrates an aircraft propulsion system 20 that generates a steam flow 46 from water 44 recovered from an exhaust gas flow 34. A water recovery system 58 condenses water from the humid gas flow 34 in a series of condensers 38. The example condensers 38 include features that are aligned with gravity to facilitate condensate drainage and flow.

The example propulsion system 20 includes a propulsive fan 24 and a core engine 22. The core engine 22 includes a compressor section 26, a combustor section 28 and the turbine section 30 disposed along an engine longitudinal propulsor axis A. The fan 24 drives a bypass airflow 42 along a bypass flow path B, while the compressor section 26 draws a core flow 32 along a core flow path C. The core flow 32 is compressed and communicated to the combustor section 28 where the compressed core flow 32 is mixed with a fuel flow 48 and ignited to generate an exhaust gas flow 34. The exhaust gas flow 34 expands through the turbine section 30 where energy is extracted and utilized to drive the fan 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 35 includes at least a fuel tank 52 and a fuel pump 50 to provide the fuel flow 48 to the combustor 28. The example fuel system 35 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

A condenser 38 receives exhaust gas flow 54 exiting an evaporator 36 and condenses water 44 from the exhaust gas flow 54. The water 44 is routed to the evaporator 36 where it is heated to generate the steam flow 46 that is injected into the core flow 32 at the combustor 28. The steam flow 46 may be injected in other locations upstream of the combustor 28, such as for example, within the compressor section 26.

The exhaust gas flow 54 communicated to the condenser 38 is cooled to condense water. Accordingly, a mixture of water and exhaust gas 34 works its way through the condenser 38. Water flows are influenced by the direction of gravity and therefore the example condenser 38 is arranged in a configuration that utilizes gravity to encourage flows in a desired direction to maintain flows and movement of condensed water.

Figure 2:
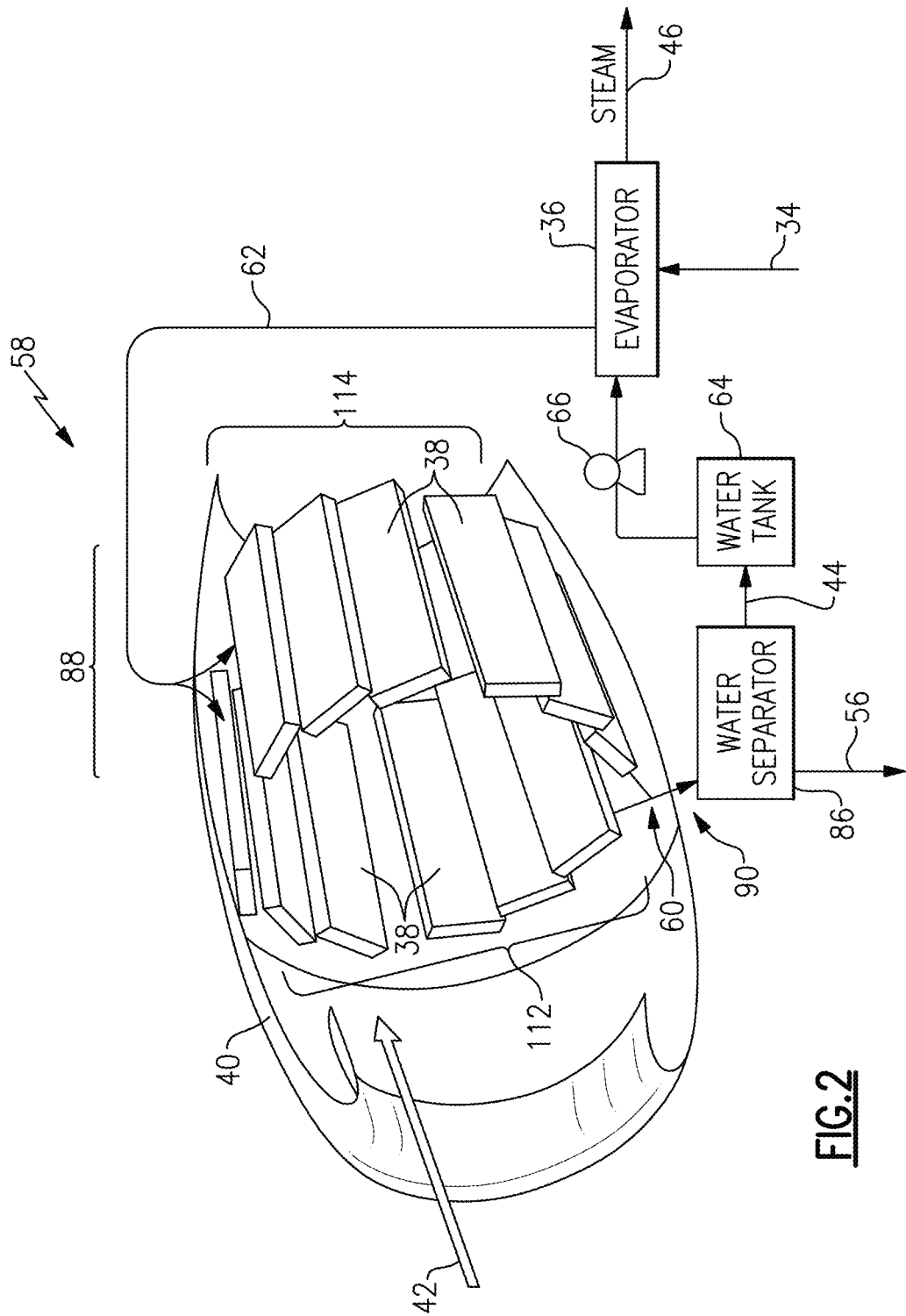
FIG. 2 is a schematic view of an example water recovery system for an aircraft propulsion system.

Referring to FIG. 2, with continued reference to FIG. 1, the example water recovery system 58 is shown in a simplified schematic drawing. The water recovery system 58 includes a series of condensers 38 that are arranged circumferentially about the propulsor axis A and supported within the nacelle 40. Each of the condensers 38 include passages for the mixed water and exhaust gas flows that are arranged such that recovered water drains downward in the direction of gravity. The example condensers 38 are in flow communication with each other such that an exhaust gas flow 62 communicated from the evaporator 36 is introduced into the series of condensers 38 at a top 88. The exhaust gas flow 62 flows downward though the condensers 38 toward a bottom 90 and is exhausted as a mixed water and gas flow indicated at 60.

The mixed flow 60 is communicated to a water separator 86 where a water flow 44 is sent to a water tank 64 and the remaining exhaust gases 56 are exhausted to the ambient environment. A pump 66 pressurizes water from the tank 64 and communicates that water flow the evaporator 36 for generation of the steam flow 46.

The condensers 38 are arranged circumferentially from the top 88 to the bottom 90 such that as water is condensed from the gas flow 62, it flows toward the bottom 90 and the water separator 86. In the disclosed example, the condensers 38 are divided with a first group 112 disposed on one side and a second group 114 disposed on the other side. Grouping the condensers 38 on either side of the engine provide for each of the groupings to have a substantially downward path for the mix of water and exhaust gas flow.

Figure 4:
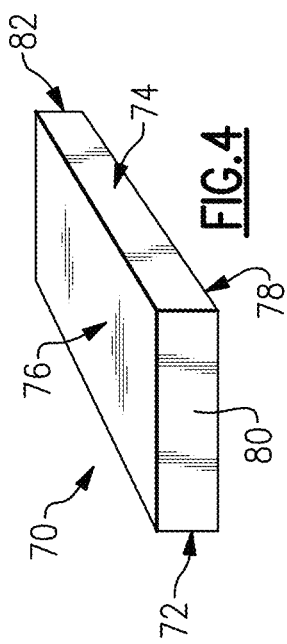
FIG. 4 is a schematic view of an example condenser.
Figure 3:
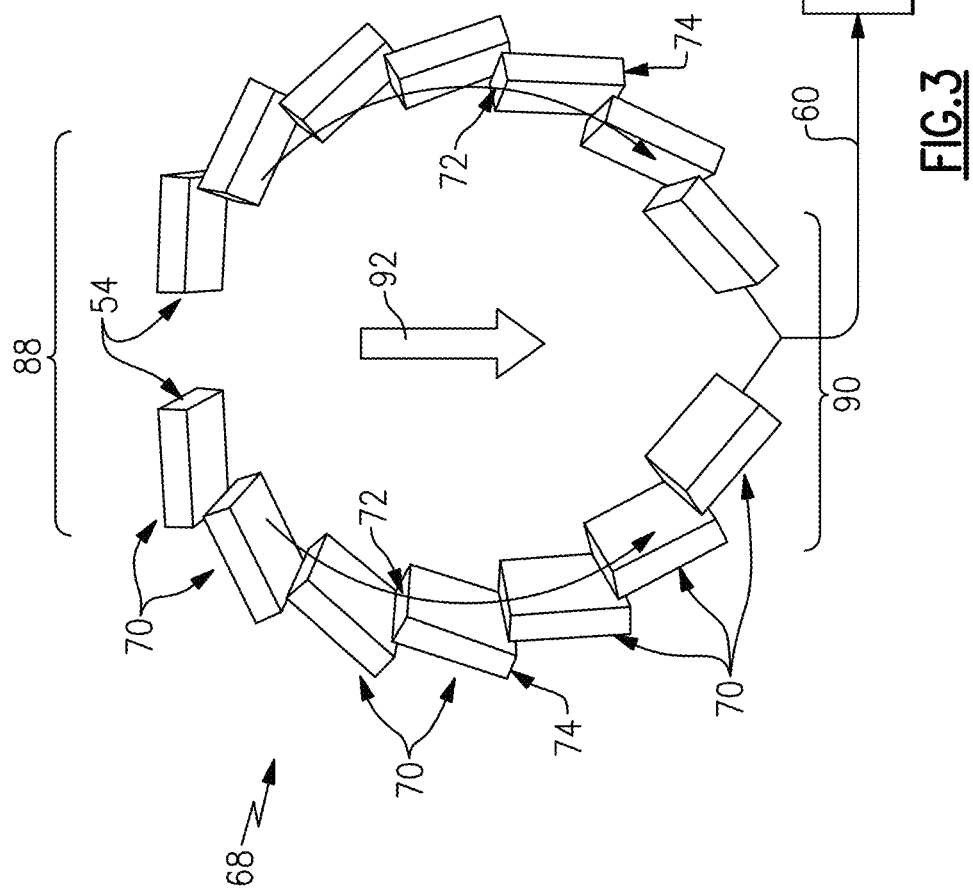
FIG. 3 is a schematic view of an example condenser configuration.

Referring to FIGS. 3 and 4 with continued reference to FIG. 2, an example condenser arrangement 68 of the water recovery system 58 is shown and includes a plurality of modular condensers 70 arranged circumferentially. The exhaust gas flow 54 is introduced near the top 88 and flows through the condensers 70 to the bottom 90 where the mixed liquid and exhaust gas flow 60 is exhausted and communicated to the water separator 86.

Each of the series of condensers 70 include a top 76 spaced radially apart from a bottom 78, an upper side 72 spaced circumferentially from a lower side 74, a forward side 80 and an aft side 82. It should be noted that the condensers 70 are shown schematically and may be shapes other than the rectangular boxes shown by way of example. Moreover, the condensers 70 are arranged circumferentially and would be in flow communication with adjacent condensers 70.

Figure 5:
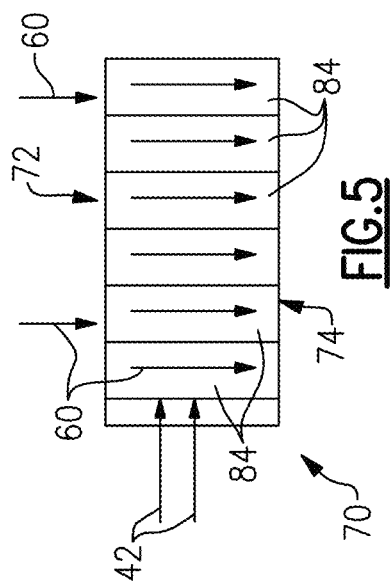
FIG. 5 is another schematic view of the example condenser of FIG. 4.

Referring to FIG. 5, with continued reference to FIGS. 3 and 4, each condenser 70 includes passages 84 for the mixed flow 54. The passages 84 extend between the upper side 72 to the lower side 74. The upper side 72 is disposed above the lower side 74 such that gravity draws the flow of condensate from the upper side 72 toward the lower side 74. The cooling bypass airflow 42 is directed transverse to flow through the passages 84. The cooling bypass airflow 42 may flow over the top 76 and bottom 78 of each condenser 70 in a direction common with the propulsor axis A. Although the bypass flow 42 is shown and described by way of example, other cooling flows may be utilized and are within the contemplation of this disclosure.

Water condensed from the humid exhaust has flow 54 flows downwardly in a direction of gravity as indicated by arrow 92. The condensers 70 are arranged such that the passages 84 are aligned with gravity to encourage water flows to drain to the water separator 86. The downward orientation of the passages 84 prevents potential back flow and pooling of condensate within the series of condensers 70.

Referring to FIGS. 6 and 7, another example condenser arrangement 94 for the water recovery system 58 is schematically shown and includes several groupings of condensers 104 that are all aligned with gravity 92. In the illustrated example, the series of condensers 104 are split into a first group 96, a second group 98 a third group 100 and a fourth group 102. The first group 96 and the second group 98 receiving an exhaust gas flow 54 near the top 88 and exhaust the gas flow and water 110 near a mid-portion 114. The third group 100 and the fourth group 102 receive the gas flow 54 near the mid-portion 114 and exhaust the mixed water and exhaust gas flow 110 at the bottom 90. The different groupings of condensers 104 provides for control of condensing operations that may be tailored to engine operation.

Adjacent condensers 104A, 104B are in flow communication with each other such that mixed water and gas flow 110 is aligned with gravity 92. Moreover, the passages 112 through the condensers 104A, 104B extend from an upper side 106 toward a lower side 108. Accordingly, each of the upper sides 106 are arranged adjacent a lower side 108 of a higher up condenser 104. Moreover, the specific fluid and gas communication between the condensers 104A, 104B may be an integral connection or provided by a suitable conduit or flow device.

Although example condenser configurations are disclosed by way of example, other configurations and relative orientations of condensers could be utilized and are within the contemplation of this disclosure. Moreover, although the example configuration is disclosed by example with condensers, other systems that utilized heat exchangers, would benefit from this disclosure and is within the contemplation and scope of this disclosures.

Accordingly, the example water recovery system includes a beneficial condenser arrangement that aligns flow passages with gravity to encourage drainage of moisture extracted from an exhaust gas flow.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
    a core engine including a compressor, combustor, and turbine section, wherein an inlet airflow is compressed communicated to the combustor, mixed with fuel, and ignited to generate an exhaust gas flow that is expanded through the turbine section;
    a propulsor driven about a propulsor axis by the core engine;
    a water recovery system comprising a series of condensers that include a series of passages for water containing exhaust gas flow, wherein the series of passages are defined about the propulsor axis such that recovered water drains downward in a direction of gravity through the series of passages; and
    an evaporator where a steam flow is generated from water separated from the exhaust gas flow and communicated to the combustor.

2. The aircraft propulsion system as recited in claim 1, wherein each of the series of condensers comprise a top spaced radially apart from a bottom, an upper side spaced circumferentially from a lower side, a forward side, and an aft side, and at least one of the series of passages extends between the upper side and the lower side.

3. The aircraft propulsion system as recited in claim 2, where each of the series of condensers is configured such that the passages extend between the upper side and the lower side.

4. The aircraft propulsion system as recited in claim 2, wherein a cooling flow is in communication with the top and the bottom of each of the series of condensers.

5. The aircraft propulsion system as recited in claim 2, wherein the top and bottom extend axially between the forward side and the aft side.

6. The aircraft propulsion system as recited in claim 2, wherein the series of passages are all in flow communication with each other.

7. The aircraft propulsion system as recited in claim 2, wherein the series of passages comprise a first grouping of passages communicating water along a first side of the core engine and a second grouping of passages communicating water along a second side of the core engine.

8. The aircraft propulsion system as recited in claim 1, further comprising at least one outlet where water from the series of passages is communicated to the evaporator.

9. The aircraft propulsion system as recited in claim 8, wherein the evaporator communicates heat from the exhaust gas flow into the water to generate the steam flow.

10. The aircraft propulsion system as recited in claim 1, further comprising a support structure at least partially surrounding the core engine, wherein the series of condensers are mounted to the support structure.

11. The aircraft propulsion system as recited in claim 10, wherein the support structure comprises a nacelle surrounding a portion of the core engine.

12. A water recovery system for an aircraft propulsion system comprising:
  a series of condensers comprising a series of passages for an exhaust gas flow, wherein each of the series of condensers comprise a top spaced radially apart from a bottom, an upper side spaced circumferentially from a lower side, a forward side, and an aft side, wherein the series of passages are defined about an engine longitudinal axis such that recovered water drains downward in a direction of gravity through the series of passages; and
  an evaporator where a steam flow is generated from water separated from the exhaust gas flow for communication to a core engine.

13. The water recovery system as recited in claim 12, wherein the series of passages comprise a first grouping of passages communicating water along a first side of the core engine and a second grouping of passages communicating water along a second side of the core engine.

14. The water recovery system as recited in claim 13, wherein the series of passages are all in flow communication with each other.

15. The water recovery system as recited in claim 12, wherein at least one of the series of passages extends between the upper side and the lower side of each of the series of condensers.

16. The water recovery system as recited in claim 12, wherein the series of passages comprise a first grouping of passages communicating water along a first side of the series of condensers and a second grouping of passages communicating water along a second side of the series of condensers.

17. The water recovery system as recited in claim 12, where each of the series of condensers is configured to comprise at least one exhaust gas passage that extends between the bottom and the top.

18. The water recovery system as recited in claim 12, wherein a cooling flow is in communication with the at least one of the top and the bottom of each of the series of condensers.

19. A method of assembling an aircraft propulsion system comprising:
  assembling a core engine comprising a compressor, combustor and turbine section that is configured to compress and communicate an inlet airflow to the combustor, where the inlet airflow from the compressor is mixed with fuel and ignited to generate an exhaust gas flow that is expanded through the turbine section;
  assembling a propulsor configured to be driven about a propulsor axis by the core engine;
  assembling a water recovery system including a series of condensers that comprise a series of passages for water recovered from the exhaust gas flow, wherein the series of passages are disposed about the propulsor axis such that recovered water drains downward in a direction of gravity through the series of passages; and
  assembling an evaporator that is configured for generating a steam flow using heat from the exhaust gas flow to vaporize water separated from the exhaust gas flow by the series of condensers and to communicate the steam flow to the combustor.

20. The method as recited in claim 19, further comprising assembling the series of condensers to receive a cooling flow for condensing water from the exhaust gas flow.

\* \* \* \* \*